United States Patent
Katagiri et al.

(10) Patent No.: US 7,496,696 B2
(45) Date of Patent: Feb. 24, 2009

(54) METHOD AND APPARATUS FOR EVALUATING PERFORMANCE ON HOST DATA TRANSFER WITHIN A TAPE DRIVE

(75) Inventors: Takashi Katagiri, Yokohama (JP); Hironobu Nagura, Kawasaki (JP); Hirokazu Nakayama, Fujisawa (JP); Kazuhiro Ozeki, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 11/700,996

(22) Filed: Feb. 1, 2007

(65) Prior Publication Data
US 2007/0226336 A1    Sep. 27, 2007

(30) Foreign Application Priority Data
Mar. 10, 2006    (JP)    ............... 2006-066625

(51) Int. Cl.
*G06F 3/00*    (2006.01)
(52) U.S. Cl. .................... 710/29; 710/74; 360/73.01; 360/74.1
(58) Field of Classification Search .............. None
See application file for complete search history.

(56) References Cited

U.S. PATENT DOCUMENTS

| | | | |
|---|---|---|---|
| 5,101,311 A * | 3/1992 | Richmond | 360/69 |
| 5,379,152 A * | 1/1995 | Odaka et al. | 360/48 |
| 6,226,441 B1 * | 5/2001 | Hartung et al. | 386/46 |
| 2006/0085594 A1 * | 4/2006 | Roberson et al. | 711/114 |

FOREIGN PATENT DOCUMENTS

| | | |
|---|---|---|
| JP | 03-214315 | 9/1991 |
| JP | 07-200191 | 8/1995 |
| JP | 07-254221 | 10/1995 |
| JP | PUPA2000-123473 | 4/2000 |
| JP | PUPA2000-311064 | 11/2000 |
| JP | PUPA2006-318571 | 11/2006 |
| WO | WO 01/24180 A1 | 4/2001 |

OTHER PUBLICATIONS

Translation of Examiner Cited art in Japanese Office Action dated Oct. 14, 2008.

* cited by examiner

*Primary Examiner*—Eron J Sorrell
(74) *Attorney, Agent, or Firm*—Ingrassia Fisher & Lorenz, P.C.

(57) ABSTRACT

A method for evaluating data transfer performance within a data recording apparatus is disclosed. The data recording apparatus includes a buffer and a recording medium. Initially, a Pause time P when data transfer between the buffer and a host being stopped temporarily is measured. Then, an ideal Pause time Y is determined. Next, a determination is made whether or not the Pause time P exceeds a sum of the ideal Pause time Y and an allowance a. If the Pause time P exceeds a sum of the ideal Pause time Y and the allowance a, a warning signal is sent to the host.

9 Claims, 8 Drawing Sheets

METHOD AND APPARATUS FOR EVALUATING PERFORMANCE ON HOST DATA TRANSFER WITHIN A TAPE DRIVE

CROSS REFERENCE TO RELATED APPLICATIONS

The present application claims benefit of priority under 35 U.S.C. §§ 120, 365 to the previously filed Japanese Patent Application No. JP2006-066625 entitled, "Data Recording Apparatus, and Method of Evaluating Performance on Host Data Transfer in Data Recording Apparatus" with a priority date of Mar. 10, 2006, which is incorporated by reference herein.

BACKGROUND OF THE INVENTION

1. Technical Field

The present invention relates to tape drives in general, and in particular to a method and apparatus for evaluating performance on host data transfer in tape drives.

2. Description of Related Art

When a tape recording apparatus, such as a tape drive, has been used over a long period of time, a situation where a processing time for backup does not end within an expected time period may occur because of some reason or another. The overrun of backup time can be attributed to the degradation in performance on data transfer from a host. In order to prevent the overrun of backup time when the problem is at the drive side, the drive needs to report its problem to the host.

Figure 1:
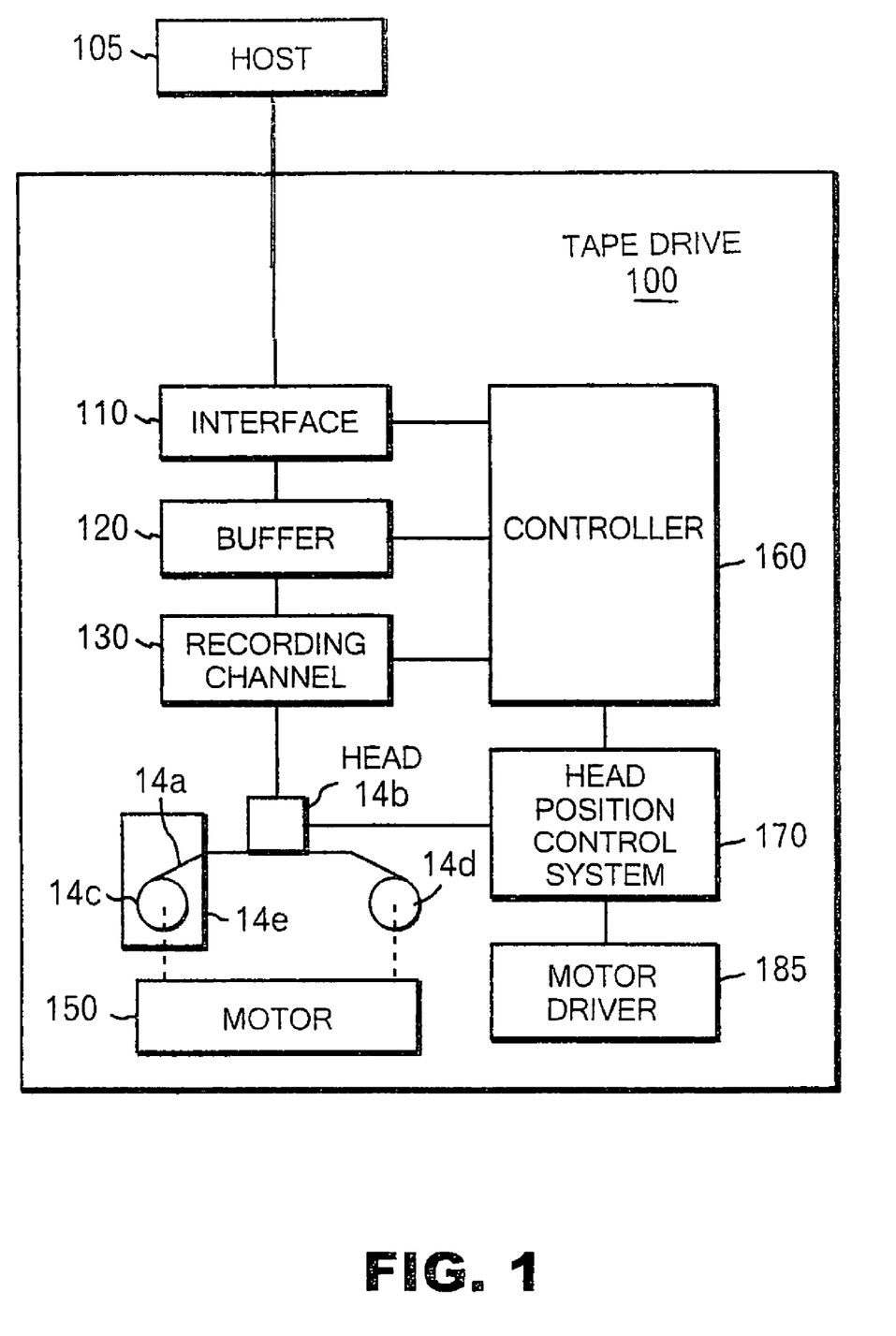
FIG. 1 is a block diagram of a tape drive.

Referring now to the drawings and in particular to FIG. 1, there is depicted a block diagram of a data recording apparatus system. As shown, a tape drive 100 includes an interface 110, a buffer 120, a recording channel 130, a tape 14a, a head 14b, reels 14c and 14d, a cartridge 14e, a motor 150, a controller 160, a head position control system 170, and a motor driver 185. Interface 110 communicates with a host 105. Interface 110 receives, from host 105, a command for instructing writing of data to be transferred to buffer 120, and a command for instructing writing of data into buffer 120 and into tape 14a. Buffer 120 is a memory, such as a random access memory, for saving data to be written into tape 14a.

Data delivered through recording channel 130 are formed in units of datasets (for example, 400 KB each), and are written into tape 14a by means of head 14b. Tape 14a is wound around reels 14c and 14d, and longitudinally moves along with rotations of the reels in a direction from reel 14c to reel 14d, or in an opposite direction. Cartridge 14e is a container for housing reel 14c around which tape 14a is wound. Motor 150 rotates reels 14c and 14d.

Controller 160 controls tape drive 100. Controller 160 controls the writing/reading of data into/from tape 14a in accordance with a command received from host 105 through interface 110. Controller 160 also controls head position control system 170 and motor driver 185. When there is a need for head 14b to switch tracks, head position control system 170 electrically controls head 14b so that head 14b can switch tracks. In addition, controller 160 monitors data (write/read data) in interface 110, buffer 120 and recording channel 130. Motor driver 185 may be connected directly to controller 160.

Figure 2:
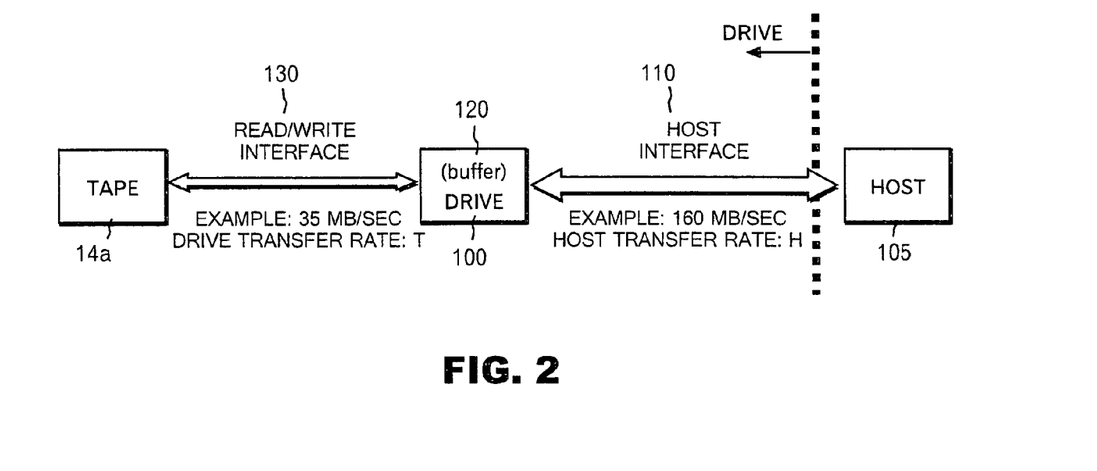
FIG. 2 shows the data flows between a host and a tape drive.

With reference now to FIG. 2, there is illustrated a process flow after data have been received from host 105. In a Linear Tape Open (LTO) type tape drive, for example, after data have been received from a host, data compression is performed on the fly in interface 110. The host transfers the data at a maximum transfer rate H (e.g., 160 MB/sec). FIG. 2 shows data transfer of compressed data from buffer 120 to tape 14a at a drive transfer rate T (e.g., 35 MB/sec) by drive 100. Drive 100 performs a Write action while performing a Pause action for temporarily stopping transfer on the host side. During the Write action, the Pause occurs when a data transfer rate from host 105 to drive 100 is faster than a data transfer rate from drive 100 (buffer 120) to tape 14a. During a Read action, a Pause state occurs when a host transfer rate from buffer 120 to host 105 is faster than a drive transfer rate from tape 14a to drive 100 (buffer 120). Between host 105 and the drive, data with arbitrary lengths are written or read. Buffer 120 is sectioned into units of segments of one uniform size for temporarily storing read/write data. The Pause state occurs during the Write action means that there is no segment in buffer 120 into which subsequent data can be written, i.e., there is no free space in buffer 120. The Pause state occurs during the Read action means that, as data are slow in being read from tape 14a to buffer 120, the entire buffer is free space.

Even if data are transferred from host 105 at the rate of 160 MB/sec, when the writing speed (the drive transfer rate) from buffer 120 to tape 14a is 35 MB/sec, host performance is dictated by the drive transfer rate as the drive transfer rate is smaller than the host transfer rate. No matter how fast the host transfer rate is, the performance of the host transfer rate at 160 MB/s cannot be exerted unless the drive can perform writing at a rate of the host transfer rate or higher. Even though the host transfer rate is not exerted, if writing data into the tape is performed at a transfer rate close to, or at least, an ideal value of the drive transfer rate at 35 MB/s, the drive can sufficiently exert writing performance thereof. Suppose, when the host has transferred 2:1 compressible data at a rate of 70 MB/s or below, the data are compressed inside the drive, and therefore, the drive theoretically never keeps the host side from waiting to transfer. In other words, the transfer rate H between the host and the drive coincides with a transfer rate expected by the host. In a case when a time period during which the drive keeps the data transfer from the host waiting is close to a calculated value, the drive can be determined as sufficiently exerting the drive transfer rate. In this case, even though the host is kept waiting to transfer data to the drive, the degradation in performance is not recognized in the data transfer from the host.

A factor in the performance degradation of the data transfer between the host and the drive does not necessarily exist only in the drive and cartridge. Also, even if numerous errors have occurred in the tape, it does not necessarily lead to the performance degradation. There are various factors in such degradation of performance, and it is very difficult to specify a cause. With respect to a problem concerning the performance of the tape drive, sometimes the performance degradation was not at the drive side but at the user side.

In some cases, the writing of data into tape 14a from buffer 120 is kept waiting due to some sort of problems in the drive and tape. Thus, the transfer rate H of the host substantially becomes not more than that rate it should have. When numerous errors occur in the drive, it can be concluded that the drive itself has become a factor in the performance degradation of the data transfer from the host. Consequently, it would be desirable to provide a method and apparatus to report to the host any error status of the drive before the error become a permanent error (irrecoverable error) when the performance of the drive starts degrading.

SUMMARY OF THE INVENTION

In accordance with a preferred embodiment of the present invention, a data recording apparatus includes a buffer and a recording medium. Initially, a Pause time P when data transfer between the buffer and a host being stopped temporarily is measured. Then, an ideal Pause time Y is determined. Next, a determination is made whether or not the Pause time P exceeds a sum of the ideal Pause time Y and an allowance a. If the Pause time P exceeds a sum of the ideal Pause time Y and the allowance a, a warning signal is sent to the host.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

With respect to factors in performance degradation in data transfers between a host and a drive, the following cases are considered:

I. Causes attributed to the drive side
   A. Causes attributed to the drive itself
      deterioration in error rate due to degradation in hardware
      problem in speed setting due to a problem in software
   B. Causes attributed to a medium
      deterioration in error rate due to quality of the tape
      damages on the tape II. Causes attributed to the usage environment of the drive
   A. Problem in performance of the server itself
   B. Problem in performance of the network (including a failure in a communications network)
   C. One attributed to an application For a system operator at the site of the data recording system, it is only necessary to be able to determine, based on a time period during which the Pause state continues (Pause time), whether the cause exists in the drive and tape, or in some other factor. If the system operator has found that the drive side has a problem, the system operator can attempt to improve performance by immediately replacing the drive, the tape cartridge and the like that have the problem. It is only necessary to be able to take time thereafter to collect error information and analyze the problematic drive. At the site, it is not necessarily required for the problematic drive to be able to precisely specify the cause of a trouble of the drive by use of the error information that is reported at the same time as the problem occurs.

When there is a problem at the drive side, which affects an actual measured value P of the Pause time. For example, when numerous errors occur inside a tape drive 100, data write transfer is kept waiting (the Pause state) longer than the host anticipates. In such a case, drive 100 does not return a Complete signal to host 105 until data saved in buffer 120 in the drive are certainly written into the tape. Since host 105 cannot send subsequent data until it receives the Complete signal, actual host transfer is delayed. When error processing occurs frequently in the drive, the host increases the actual Pause time P during which the host stops its data transfer because of the Pause action in the buffer. As a result, write performance from the host is degraded. Consequently, by measuring the Pause time P in writing data saved in buffer 120 inside the drive into the tape, it becomes possible to determine whether or not drive 100 has been a cause of performance degradation of host 105.

Figure 3:
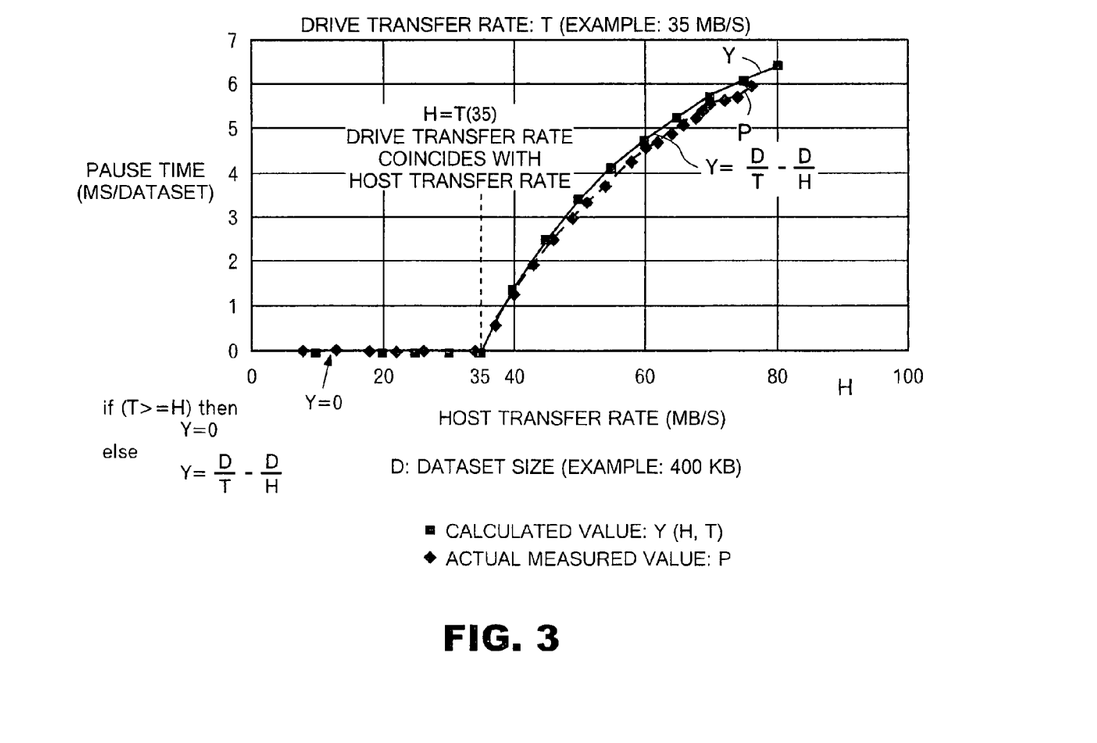
FIG. 3 shows the Pause time values P in relation to calculated values Y when there is no problem in a tape drive.

Referring now to FIG. 3, there is illustrated actual measured values P and calculated values Y (H, T) of the Pause time in cases when there is no trouble in the drive. If a drive transfer rate T (35 MB/s) is larger than a host transfer rate H (T>H), the calculated value Y of the Pause time is 0 because it is not necessary to keep the host transfer waiting. When the buffer transfer rate T (for example, 35 MB/s) is smaller than the host transfer rate H (T<H), the calculated value Y of the Pause time acquires a value larger than 0 because it is necessary to keep the host transfer waiting. In this respect, when the tape drive has a problem, an actual data transfer rate between the buffer and the tape is larger than the ideal value T (for example, 35 MB/s) of the drive transfer rate because an error recovery procedure (ERP) mediates therebetween. The performance degradation in the host transfer can be evaluated by measuring the actual measured value P of the Pause time. When the actual Pause time P is larger than the calculated value Y (H, T), the data transfer from the host is kept waiting, and the performance is considered as degraded. Specifically, during the Pause state, data yet to be written into a tape 14a still remain in buffer 120, and there is no free space available in buffer 120 for accepting the subsequent data from the host. Since drive 100 has no free space that can accept data, drive 100 cannot return a Complete signal to the host.

Figure 4:
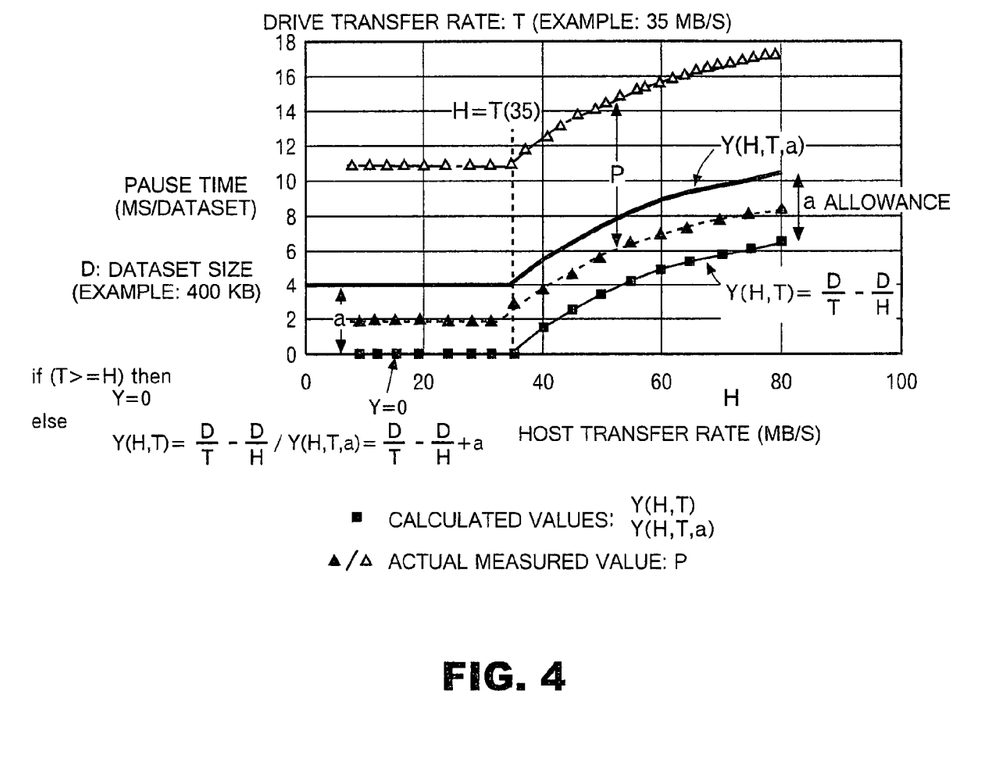
FIG. 4 shows the Pause time values P in relation to the calculated values Y when where there are problems in a tape drive.

FIG. 4 illustrates a case when host 105 is unable to send data because of the Pause action caused by performance degradation. First of all, a determination procedure of the calculated value Y (H, T) of the Pause time will be described. When the drive is operating as anticipated, as shown in FIG. 3, the actual measured value P substantially coincides with the calculated value Y. As a unit in which data are written out onto any one of buffer 120 and tape 14a, a size D (for example, 400 KB) of a dataset is given. A transfer rate between host 105 and drive 100 (buffer 120) is given as the host transfer rate H. A transfer rate between buffer 120 and tape 14a is given as the drive transfer rate T. The calculated value Y (H, T) of the Pause time is a function of the host transfer rate H and the drive transfer rate T, and the calculated value Y (H, T) is expressed as follows:

$$\begin{aligned}&\text{If } (T \geq H) \text{ then}\\&\quad Y = 0\\&\text{else}\\&\quad Y(H, T) = (D/T) - (D/H).\end{aligned}$$

An allowance a is given as an electromechanical margin of the drive, and the calculated value Y (H, T, a) of the Pause time is given by using the host transfer rate H and the drive transfer rate T, which are determined by an electromechanical property of the drive, in the following manner:

```
If (T >= H) then
    Y = a
else
    Y (H, T, a) = (D/T) − (D/H) + a.
```

In an actual usage environment, even if there is no problem in the drive side, the actual measured value P of the Pause time never exactly coincides with the calculated value Y (H, T). It can be presumed that, due to variable factors such as a usage environment of the drive, the actual measured value P becomes more or less larger than the calculated value Y (H, T). If it is allowed for the host side or the drive itself to arbitrarily set up the allowance a as the margin of the drive, the system operator can flexibly maintain an information storage system (such as a tape storage apparatus) depending on the usage environment. For example, when the system operator wants to efficiently realize a backup environment of data in a state where the drive is optimal, the system operator can set the allowance a to a small value. But when the system operator does not want to frequently replace the drive and cartridge and wants to prolong a maintenance interval to a certain period or longer, the system operator can set the allowance a to a large value.

When the following formula is satisfied, the drive concludes that there is a problem in the drive side, and sends a report or a Warning to the host regarding the reason for the error and a ratio of performance degradation:

If (P>Y (H, T, a)) then
    send Warning.

Because the drive retains various pieces of error information (E), the drive may report those pieces of error information to the host. Error Counter shown in FIG. 5 collects such pieces of error information (E).

FIG. 4 shows the actual measured values P are values Δ when there are problems in the tape drive, and the actual measured values P are values ▲ when there is no problem in the tape drive. When the actual measured values P are values ▲, consider a case when one of the write channels included in the head is not functioning as an example. The actual measured values P ▲ and Δ of the Pause time are the same in that they acquire larger values than the calculated values Y (H, T). The actual measured value P of an actual drive acquires, even if the drive is in an ideal driving state, a value of the calculated value Y (H, T) or more. If the actual measured values P are simply compared with the calculated values Y (H, T), the values P of all of the drives are evaluated as being larger than the values Y (H, T), which does not fit the actual usage status. Thus, when the actual measured values P are included in a predetermined range (the allowance a) using the calculated values Y (H, T) as a reference, it is determined that the drive has no problem. Specifically, the actual measured values ▲ are smaller values than the values Y (H, T, a) for which the allowance a is taken into consideration, and it is not determined that the drive has a problem. In contrast, the actual measured values Δ are much larger than the values Y (H, T, a), and it can be concluded that there is a problem in performance on the drive side.

From the above description on FIG. 4, it can be understand that whether performance degradation in the data transfer from the host exists in the drive side or in the usage environment side other than the drive can be determined through comparison of the actual measured value P with the calculated values Y (H, T) of the Pause time. Whether the cause of the performance degradation exists in the drive side or in the usage environment (examples of which include the host such as a server; hardware setup and a communication line error in a network; and a network/an application) other than the drive can be specified, the system operator can perform maintenance of the tape drive without making futile attempts.

Figure 5:
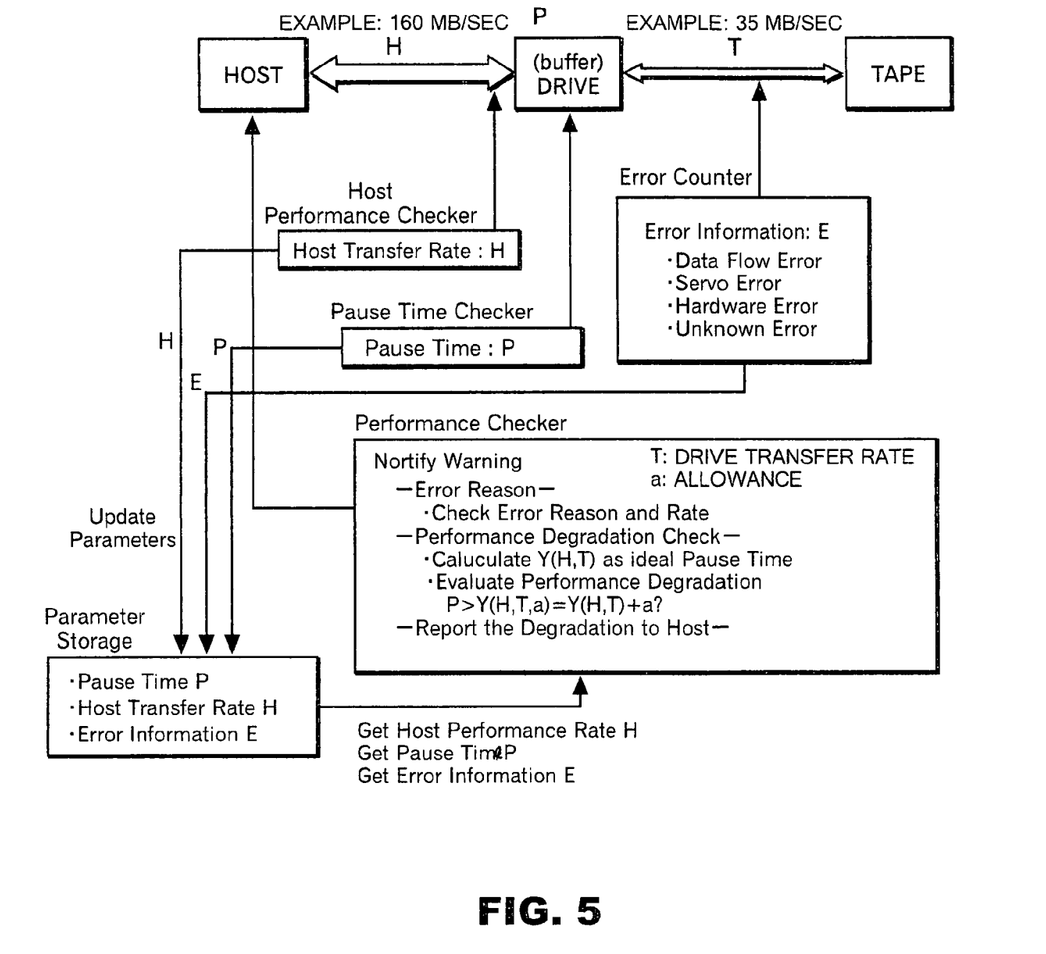
FIG. 5 shows control means inside of a tape drive for comparing the Pause time P and the calculated value Y.

Referring now to FIG. 5, there is illustrated a block diagram of a control mechanism of the drive for comparing the actual measured value P and the calculated value Y (H, T, a) of the Pause time. The control mechanism may be a part of a program contained in controller 160. The control mechanism monitors write performance degradation of the tape drive by measuring the Pause time P inside the drive and the host transfer rate H. The drive transfer rate T and the allowance a are determined by the electromechanical property of the drive, and therefore, are not to be measured by the control mechanism of the present invention. The control mechanism is functionally classified into: Host Performance Checker (details shown in FIG. 6) for measuring the host transfer rate H; Pause Time Checker (details shown in FIG. 7) for measuring the actual Pause time P; Error Counter (details shown in FIG. 8) for collecting the error information E; and Performance Checker (details shown in FIG. 9) for calculating the Pause time Y (H, T, a) and comparing it with the actual measured value P. Parameter Storage records: the Pause time P actual measured by Pause Time Checker; the host transfer rate H actual measured by Host Performance Checker; the error information E collected by Error Counter; and the like. As shown in FIG. 9, Performance Checker reads the P, H and E from Performance Storage, secures the allowance a and the drive transfer rate T, and calculates the calculated value Y (H, T, a) of the Pause time. Then, Performance Checker compares the calculated value Y (H, T, a) with the actual measured Pause time P, determines whether or not the performance degradation is in the drive side, and reports a result of the comparison to the host.

The drive can determine whether the performance degradation in the data transfer from the host to the drive is inside the drive or in some other usage environment. The drive can send a result of the determination to the host, and also transfer thereto the error information E at the same time. In addition, Performance Checker in FIG. 9 of the drive may only have to transfer the actual measured value P, the calculated value Y (H, T, a) and the error information E to the host. The host side may be configured to analyze and determine, based on the information (P, Y and E), that the drive or the tape is a factor in the performance degradation. In any one of these cases, the system operator of the tape recording apparatus system can determine whether the performance degradation is in the drive or in the usage environment. When the drive is a factor in the performance degradation, it is possible to have the system operator replace a component part, such as a drive and/or a cartridge, and complete backup of data within a certain period of time.

Figure 6:
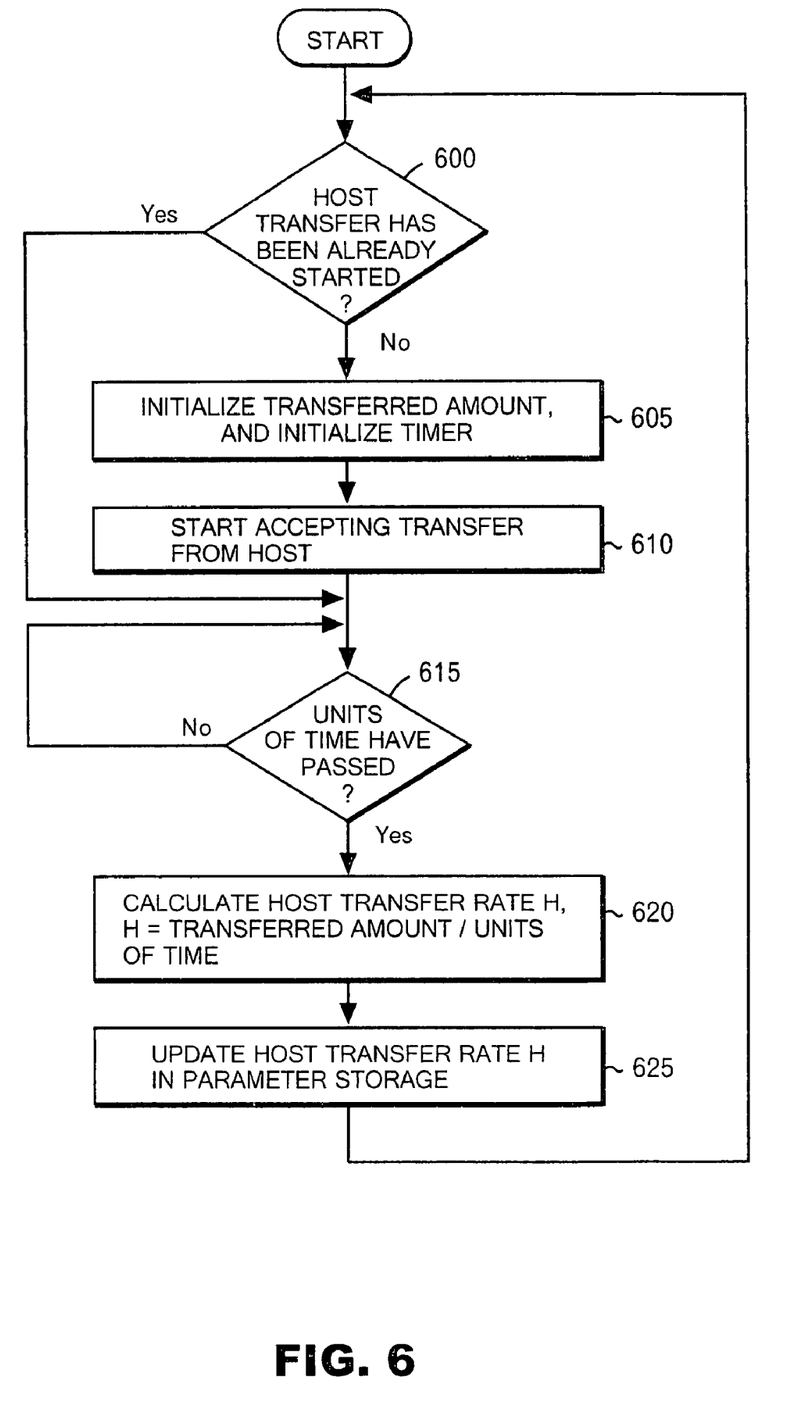
FIG. 6 is a high-level logic flow diagram of a Host Performance Checker for measuring a host transfer rate H.

With reference now to FIG. 6, there is illustrated a high-level logic flow diagram of a Host Performance Checker for measuring the actual host transfer rate H. When drive 100 is not in a Pause state, the measurement of the H is carried out. The Pause state means that drive 100 is unable to return the Complete to the host because writing data inside buffer 120 into tape 14a has not been completed, the buffer has no space available for saving transfer data. After confirming that the data transfer from the host has not yet been started (step 600), a transferred data amount and a timer are initialized (step 605). The timer is started when the reception of the data transferred from the host is started in buffer 120 (step 610). With a time period for carrying out the measurement being sectioned, buffer 120 continues receiving data from the host until a predetermined number of units of time pass (step 615). When that predetermined number of units of time has passed, the host transfer rate H (for example, 160 MB/s) is computed by dividing a total of the transferred data amount by these units of time (step 620). The H is used for calculating the calculated value Y (H, T) of the Pause time of the drive. The calculated is H is saved in a memory of the drive (step 625). Taking consideration of variation dependent on the usage environment, the host transfer rate is measured as needed, and the value is updated (step 625).

Figure 7:
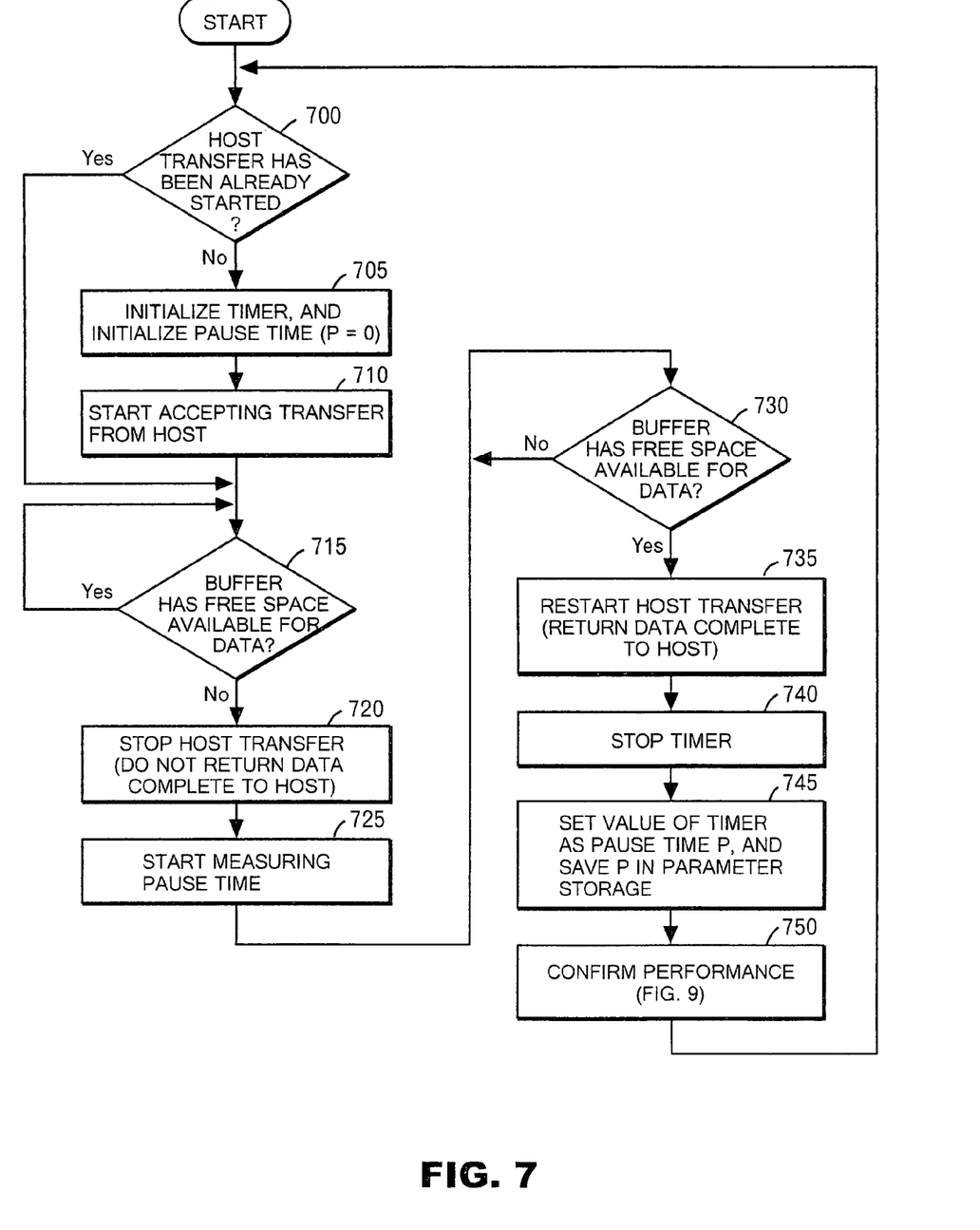
FIG. 7 is a high-level logic flow diagram of a Pause Time Checker for measuring a Pause time P during which data transfer from a host is being kept waiting.

Referring now to FIG. 7, there is depicted a high-level logic flow diagram of a Pause Time Checker for measuring the actual measured value P of the Pause time. Whether or not the host transfer is being performed is confirmed (step 700) by buffer 120, and, if it is not in a state where the host transfer is not being performed, a timer and P are initialized (step 705), and the buffer receives data form the host (step 710). When buffer 120 is filled up with the data, the data transfer from the host is stopped because a Complete signal is not returned to the host (steps 715 and 720). It is not until this point that the timer is set ON, and a measurement of the Pause time is started (step 725). In buffer 120, until the Complete is returned (step 735), a time period of the Pause state is measured with the timer being in an ON state (step 730). When buffer 120 has come to have a space available and become able to accept data (step 730), controller 160 of drive 100 return the Complete to the host, thereby telling that data transfer is possible (step 735). At this stage, the timer is stopped, and a value of the timer at this point is recorded as the actual measured value P of the Pause time. The actual measured value P is measured as needed to be stored in a memory, and is updated (step 745). In a processing flow in FIG. 9, this actual measured value P is used to compare with the calculated value Y (H, T, a) (step 750).

Figure 8:
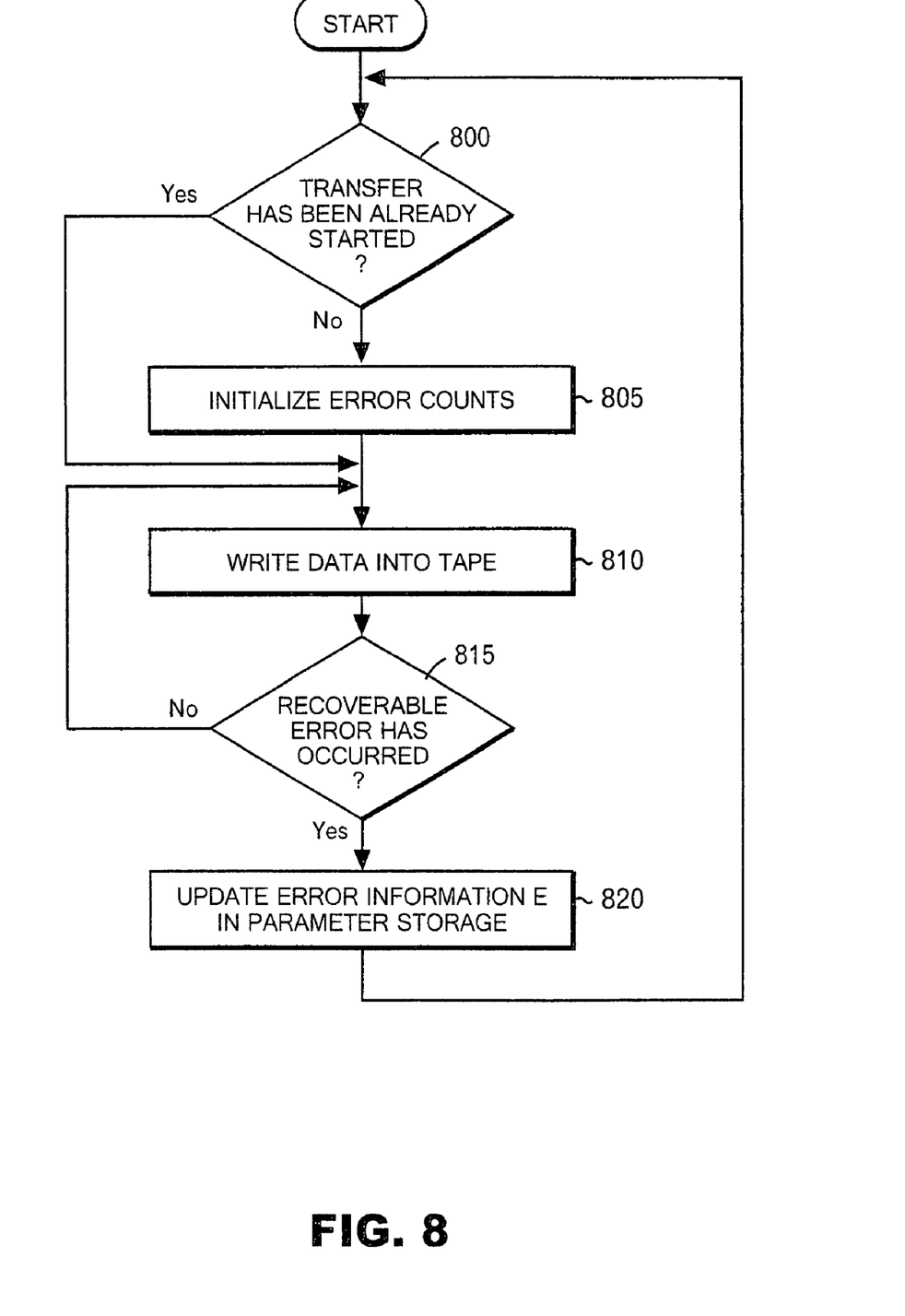
FIG. 8 is a high-level logic flow diagram of a Error Counter for collecting information on various recoverable errors in an E drive.
Figure 9:
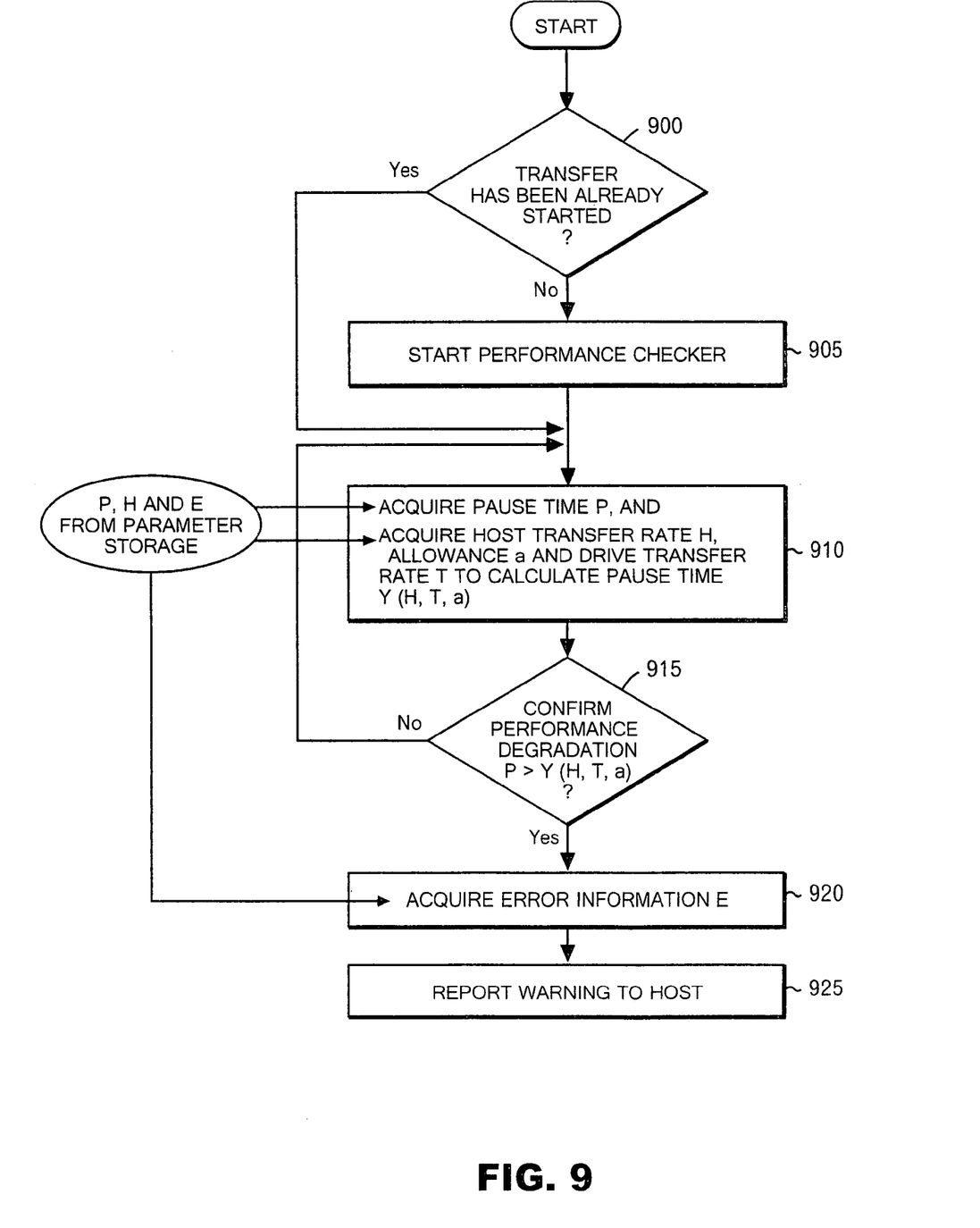
FIG. 9 is a high-level logic flow diagram of a Performance Checker for comparing an actual measured value P and a calculated value Y.

With reference now to FIG. 8, there is illustrated a high-level logic flow diagram of an Error Counter for collecting various pieces of the error information E on the drive, the cartridge, and other parts of the drive. After confirming that the data transfer is not performed (step 800), various error counters are initialized (step 805). When data transferred from the host are written into the tape by way of buffer 120 (step 810), in a case when various recoverable errors had occurred (step 815), the error information E on those errors are collected in the memory area (step 820).

Referring now to FIG. 9, there is depicted a high-level logic flow diagram of a Performance Checker for comparing the actual measured value P and the calculated value Y (H, T, a) of the Pause time with each other, and sends a warning to the host that the drive is a factor in performance degradation. After confirming that the data transfer is not being performed (step 900), comparison between the actual measured value P and the calculated value Y (H, T, a) of the Pause time is started (step 905). As needed, the most updated actual measured value P of the Pause time, the host transfer rate H, and the error information E are acquired from the memory area (step 910). Then, the calculated value Y (H, T, a) is found (step 910) by utilizing the drive transfer rate T and the allowance a that have been already secured. Then, the actual measured value P and the calculated value Y (H, T, a) of the Pause time are compared with each other (step 915). If the actual measured value P exceeds the calculated value Y (H, T, a), the host is warned that a factor in performance degradation is in the drive (step 925). Upon the receipt of the warning, the error information may be acquired (step 920), and be sent at the same time (step 925). Detailed error information on the drive and the tape may be reported (subjected to "Notify Warning") to the host. The error information E may be configured to contain: various reasons for errors and a degradation ratio. In addition, the Performance Checker may be configured only to simply report the P and Y (H, T, a) to the host, and let the host to conclude that there is a problem in the drive.

In the processing flows shown in FIGS. 5 to 9, a factor in increase in the actual Pause time P can be specified by analyzing the detailed error information appended upon the receipt of the warning. However, because there is a change in external factors such as the host and an extension of the drive or the buffer, it cannot necessarily be said that an increase in error (especially, ERP) in the drive and the recording medium directly contributes to the Pause time P. An essence of the present invention is that, by focusing on the actual measured value P of the Pause time being a parameter that directly influences performance, it is only sufficient to determine whether the performance degradation in the host data transfer is in the drive side or in an external factor. In addition, by analyzing the detailed error information, the tape drive system of the present invention is able to report, without making vain attempts, through the host to the system operator the necessity of replacing constituent parts, including the drive and the cartridge.

As has been described, the present invention provides a method and apparatus for evaluating performance on host data transfer in a tape drive. Although the present invention has been described with respect to a tape drive, the present invention can also be applied to general storage media such as hard disk drives. In addition, although an embodiment related to writing from the host is described, the present invention is also applicable to degradation in performance on the host transfer upon a data read request from the host.

While the invention has been particularly shown and described with reference to a preferred embodiment, it will be understood by those skilled in the art that various changes in form and detail may be made therein without departing from the spirit and scope of the invention.

What is claimed is:

1. A method for evaluating performance on data transfer in a data recording apparatus, wherein said data recording apparatus includes a buffer and a recording medium, said method comprising:

measuring a Pause time P when data transfer between said buffer and a host is stopped temporarily;

determining an ideal Pause time Y, wherein said ideal Pause time Y is determined by Y=D T −D H, where D is a dataset size of a data transfer, T is a drive transfer rate between said buffer and said recording medium, and H is a host transfer rate between said buffer and said host;

determining whether or not said Pause time P exceeds a sum of said ideal Pause time Y and an allowance a;

in response to a determination that said Pause time P exceeds a sum of said ideal Pause time Y and said allowance a, sending a warning signal to said host.

2. The method of claim 1, wherein said Pause time P is measured as a time period when no free space exists in a buffer because preceding data temporarily saved in said buffer have not been written into a recording medium of said data recording apparatus, or as a time period when reading of data into a host is kept waiting because data have not been read out from said recording medium to said buffer.

3. The method of claim 1, wherein said allowance a is an electromechanical property of said data recording apparatus.

4. A computer usable medium having a computer program product for evaluating performance on data transfer in a data recording apparatus, wherein said data recording apparatus includes a buffer and a recording medium, said computer usable medium comprising:

program code means for measuring a Pause time P when data transfer between said buffer and a host is stopped temporarily;

program code means for determining an ideal Pause time Y, wherein said ideal Pause time Y is determined by $Y = DT - DH$ where D is a dataset size of a data transfer, T is a drive transfer rate between said buffer and said recording medium, and H is a host transfer rate between said buffer and said host;

program code means for determining whether or not said Pause time P exceeds a sum of said ideal Pause time Y and an allowance a;

program code means for, in response to a determination that said Pause time P exceeds a sum of said ideal Pause time Y and said allowance a, sending a warning signal to said host.

5. The computer usable medium of claim 4, wherein said Pause time P is measured as a time period when no free space exists in a buffer because preceding data temporarily saved in said buffer have not been written into a recording medium of said data recording apparatus, or as a time period when reading of data into a host is kept waiting because data have not been read out from said recording medium to said buffer.

6. The computer usable medium of claim 4, wherein said allowance a is an electromechanical property of said data recording apparatus.

7. A data recording apparatus capable of evaluating data transfer performance, wherein said data recording apparatus includes a buffer and a recording medium, said data recording apparatus comprising:

a controller;

a pause time checker operational on the controller for measuring a Pause time P when data transfer between said buffer and a host is stopped temporarily;

means on the controller for determining an ideal Pause time Y, wherein said ideal Pause time Y is determined by $Y = DT - DH$ where D is a dataset size of a data transfer, T is a drive transfer rate between said buffer and said recording medium, and H is a host transfer rate between said buffer and said host;

a performance checker operational on the controller for determining whether or not said Pause time P exceeds a sum of said ideal Pause time Y and an allowance a; and     means on the controller for, in response to a determination that said Pause time P exceeds a sum of said ideal Pause time Y and said allowance a, sending a warning signal to said host.

8. The data recording apparatus of claim 7, wherein said Pause time P is measured as a time period when no free space exists in a buffer because preceding data temporarily saved in said buffer have not been written into a recording medium of said data recording apparatus, or as a time period when reading of data into a host is kept waiting because data have not been read out from said recording medium to said buffer.

9. The data recording apparatus of claim 7, wherein said allowance a is an electromechanical property of said data recording apparatus.

\* \* \* \* \*